(12) United States Patent
Komiya et al.

(10) Patent No.: US 8,784,957 B2
(45) Date of Patent: Jul. 22, 2014

(54) FLAT CONTAINER COMPRISING THERMOPLASTIC RESIN AND METHOD FOR MOLDING THE SAME

(75) Inventors: Atsushi Komiya, Yokohama (JP); Hiroyuki Honda, Tokyo (JP); Takuya Fujikawa, Yokohama (JP); Akihiko Morofuji, Kanagawa (JP)

(73) Assignee: Toyo Seikan Group Holdings, Ltd., Tokyo (JP)

( * ) Notice: Subject to any disclaimer, the term of this patent is extended or adjusted under 35 U.S.C. 154(b) by 1188 days.

(21) Appl. No.: 11/575,435

(22) PCT Filed: Sep. 15, 2005

(86) PCT No.: PCT/JP2005/017442
§ 371 (c)(1),
(2), (4) Date: Jul. 16, 2008

(87) PCT Pub. No.: WO2006/030972
PCT Pub. Date: Mar. 23, 2006

(65) Prior Publication Data
US 2009/0130352 A1  May 21, 2009

(30) Foreign Application Priority Data

Sep. 17, 2004 (JP) ................ 2004-272637
Jul. 19, 2005 (JP) ................ 2005-209281

(51) Int. Cl.
*B32B 1/02* (2006.01)
*B32B 1/08* (2006.01)

(52) U.S. Cl.
USPC ....... 428/35.7; 428/34.1; 428/34.2; 428/35.9; 428/36.9

(58) Field of Classification Search
USPC ............... 428/34.1, 34.2, 35.7, 35.9, 36.9
See application file for complete search history.

(56) References Cited

U.S. PATENT DOCUMENTS

| 4,380,526 A | * | 4/1983 | Agrawal | 264/537 |
| 4,741,955 A | * | 5/1988 | Saito et al. | 428/325 |
| 2003/0047565 A1 | * | 3/2003 | Oda et al. | 220/660 |

FOREIGN PATENT DOCUMENTS

| JP | 54-159471 A | 12/1979 |
| JP | 2002-283441 A | 10/2002 |

OTHER PUBLICATIONS

International search report of PCT/JP2005/017442, date of mailing Nov. 8, 2005.

* cited by examiner

*Primary Examiner* — Marc Patterson
(74) *Attorney, Agent, or Firm* — Westerman, Hattori, Daniels & Adrian, LLP (57) ABSTRACT

The invention realizes easy manufacturing of a flat container molded by blow molding, in which the wall thickness of a container wall is made uniform, and which provides improved mechanical strength, heat resistance, etc. and has a good appearance.

The flat container obtained by the blow molding of a polyester resin is characterized in that the container has a flatness ratio of not less than 1.3, and in that its body has a wall thickness ratio of a maximum wall thickness to a minimum wall thickness of not more than 1.6, a difference in elongation between a maximally stretched portion and a minimally stretched portion of not more than 150% in a tensile test at 95° C., a crystallinity of not less than 30%, and a difference in TMA non-load change between a maximally stretched portion and a minimally stretched portion of not more than 500 µm at 75° C. and 100° C.

6 Claims, 7 Drawing Sheets

(a) Front view, side view (b) Arrowed section A-A (c) Section B-B

Figure 4

(a) Front view (b) Plan view (arrowed section C-C)

(c) Sectional view (section D-D)

FLAT CONTAINER COMPRISING THERMOPLASTIC RESIN AND METHOD FOR MOLDING THE SAME

TECHNICAL FIELD

The present invention relates to a flat container made of a thermoplastic resin and, more particularly, to a flat container whose section is an ellipse or a rectangle or has other shapes, the body of which has a uniformly formed wall thickness, and which has high thermal resistance and is not deformed at high temperatures and a method for molding the flat container.

BACKGROUND ART

Thanks to their excellent mechanical strength, moldability, transparency, recyclability of resources, etc. polyester resin containers, such as PET bottles, have been recognized as containers for food and drink and they have been in great demand. In particular, recently polyester resin containers have been habitually used by consumers as portable small containers for beverage use. The heat resistance and pressure resistance of such small containers for beverage use have been remarkably improved by the development of the two-stage blow molding process (refer to Japanese Patent Publication No. 4-56734 (claim 1 and the upper section of the left column on page 2)) and small containers have become capable of being used for high-temperature beverages and beverages requiring high-temperature pasteurization. Thus, they have become able to meet consumers' strong requests for portable high-temperature beverages for the winter season in daily life.

Furthermore, reuse systems of PET bottles have been established to meet the social requests for resource savings and environmental protection, and the cleanliness due to the transparency of containers and the sense of safety by seeing the beverages inside through containers meet consumers' cleanliness-oriented trends, with the result that the demand for polyester resin containers represented by PET bottles has been increasing further.

Recent consumers prefer beverage bottles of flat shape having a rectangular section etc. because these bottles are easy to hold and beautiful thanks to their complex shapes, whereas bottles having a circular section tend to be avoided because they are difficult to grip due to slipperiness when their surfaces become wet and because they lack aesthetic impressions due to the simple shape of a circle.

Flat containers having flat shapes with rectangular, elliptical or other sections that tend to be liked by consumers and have a very strong demand are manufactured by blow molding (molding by blowing the air), with a preformed, bottomed parison (a preform) inserted into the interior of a mold having a flat section and attached thereto. On the occasion of molding into a flat shape, the wall thickness of a container wall tends to become nonuniform due to a difference in the amount of elongation in the major axis direction and minor axis direction of the section of the container and for other reasons.

As a measure to prevent this, there is known, for example a method for obtaining a flat container that involves inflating a bottomed parison having a circular section in a first blow mold into an intermediate molded article, inserting this intermediate molded article into a second blow mold, flattening the intermediate molded article into an elliptical shape by mold closing, and performing thereafter blow molding (refer to Japanese Patent Publication No. 59-53861 (Claims for the Patent and FIG. 1)). In this method, however, the shapability by blow molding is insufficient and wrinkles due to the waviness of concavities occurring partially on the surface of an intermediate molded article are apt to remain on the surface of a product, posing the problems of a poor appearance and insufficient strength.

In addition, some methods and apparatus for aiming at a uniform wall thickness in the manufacture of a flat container by blow molding have been disclosed. They are, for example, a bottomed cold parison blow molding process, which involves heating a bottomed cold parison before blow molding so that a portion stretched in the minor axis direction of a flat shape obtains a higher temperature than a portion stretched in a major axis direction or using a bottomed parison that is formed with thickness uniformity so that the wall thickness of a portion stretched in the major axis direction becomes large and the wall thickness of a portion stretched in the minor axis direction becomes small, and radiant heating the bottomed parison in its periphery while rotating the bottomed parison in the axial direction (refer to Japanese Patent Laid-Open No. 2000-127230 (Claims for the Patent and paragraphs 0005 to 0008)), and a molding mold that performs blow molding by housing a parison within a cavity of a split mold, advancing moving mold member to the parison surface and flattening the parison, and molds a container having high flatness which is such that the size ratio of a flat surface to side surfaces is not more than ½ with a uniform wall thickness (refer to Japanese Patent Laid-Open No. 8-294958 (Claims for the Patent and paragraphs 0003 and 0004)). In general, however, it is difficult to obtain the uniformity of the wall thickness of container walls because the elongation and expansion of a parison within a cavity do not become uniform due to the flat section and material accumulation occurs due to insufficient elongation on the minor axis side, with the result that it is difficult to manufacture a flat container with a uniform wall thickness of the container body.

When the wall thickness becomes nonuniform, the mechanical strength and heat resistance of a container decrease due to thin-walled portions. When such containers are used as high-temperature beverage containers, there is a fear that the deformation of the containers may occur because they cannot withstand inner pressure loads due to the expansion of beverages in the containers at high temperatures and external pressure loads due to the shrinkage of the interior during temperature drops.

On the other hand, in a flat container obtained by blow molding, from viewpoints different from the intension to improve the blow molding process, there has scarcely been made any proposal as yet to make improvements on mechanical strength, heat resistance, etc. specific to flat containers by specifying flat containers by physical properties and imparting characteristics to flat containers and to prevent the fear that the deformation of the containers may occur because they cannot withstand inner pressure loads due to the expansion of beverages in the containers at high temperatures and external pressure loads due to the shrinkage of the interior during temperature drops, and under the present circumstance, there is only a proposal which is such that a polyolefin-based flat container obtained by injection blow molding in which only the flatness ratio (the maximum major axis of the body/the minimum minor axis of the body) and wall thickness are specified is shown (refer to Japanese Patent Laid-Open No. 11-170344 (claims 1 to 3 of Claims for the Patent)).

In view of the condition of such conventional techniques in flat thermoplastic resin containers such as polyester resin containers obtained by blow molding, which are liked by consumers as beverage plastic containers and their demand is especially increasing because they are easy to carry and beautiful thanks to complex shapes, the present inventors consider that the first problem to be solved by the invention is to realize a flat container excellent in mechanical properties and heat resistance by specifying flat containers by physical properties and imparting characteristics to flat containers and improving mechanical strength, heat resistance, etc. specific to flat containers. At the same time, in the manufacture of a plastic flat container for beverage having a flat sectional shape, such as a rectangle by blow molding, from the standpoint of a molding method of such a flat container, the present inventors consider that the second problem to be solved by the invention is to realize a molding method for easily manufacturing a flat container with an improved uniformity of wall thickness, with improved mechanical strength, heat resistance, etc. and with a good appearance without a wrinkle.

DISCLOSURE OF THE INVENTION

Aiming at solving the above-described first problem in flat containers made of a thermoplastic resin in order to clearly materialize a flat container excellent in mechanical strength, heat resistance, etc. by a uniform wall thickness of the container wall and the like, the present inventors investigated the specification and impartment of characteristics in flat containers in which blow molding is used, considered techniques for giving a concrete form to them from various view points of physical properties and a structure of a container, and made trials. Through these processes, the present inventors could discover that the ratio of the major axis to the minor axis (flatness ratio) of a body section of a container, which expresses flatness, the wall thickness ratio of a container body, which is an index indicative of the uniformity of the whole container body, etc. relate to the extensibility in the container body at high temperatures, thermal no-load changes of the container body at high temperatures, the crystallinity of the container body, etc., and are deeply related to the mechanical strength, heat resistance, etc. of flat containers while having correlations to each other. And as a result of this, the present inventors finally reached the creation of a novel flat container as the first basic invention in the present application by specifying these correlations as numerical values.

Concretely, the above-described flatness ratio and wall thickness ratio are specified by experimentally selecting the flatness ratio and wall thickness ratio, a difference in elongation between a maximally stretched portion and a minimally stretched portion of the container body in a tensile test at 95° C. is adopted as the specification of extensibility in the container body at high temperatures, a difference in TMA non-load change between a maximally stretched portion and a minimally stretched portion in the range of 75° C. to 100° C. is selected as the specification of a thermal no-load change of the container body at high temperatures, and these relationships are correlated with each other, whereby it has become possible to clearly give a concrete form to a flat polyester resin container excellent in mechanical properties, heat resistance, etc. and to materialize the flat polyester resin container.

On the other hand, in order to easily manufacture flat containers with improved mechanical properties and heat resistance and with a good appearance without a wrinkle by performing blow molding with a uniform wall thickness of a flat container wall, the present inventors considered the construction of molding machines and molds in blow molding, molding techniques, materials for parisons, etc. from various perspectives, and accumulated experimental investigations. And as a result of this, the present inventors recognized that in order to perform blow molding with a uniform wall thickness of the container wall of a flat container by use of a simple apparatus or means and economically, contrivances in the preliminary wall thickness of a parison have an effect, discovered new means during this process, and created inventions, for which applications were filed as prior inventions (Japanese Patent Application No. 2003-314851, Japanese Patent Laid-Open No. 2005-81641).

When a parison is stretched and inflated in a mold cavity of blow molding in order to mold a flat container, the difference in the magnification of elongation between the major axis side and the minor axis side is large, and the parison is stretched greatly to the major axis (long side) side of the flat shape, with the result that the wall thickness of the parison on the major axis (long side) side is smaller than on the minor axis (short side) side. Furthermore, during the insertion of the parison into the mold, only on the minor axis side of the cavity, the parison comes into contact with the mold surface having a temperature lower than the parison and becomes cooled, resulting in a reduced degree of elongation, and a thick-walled resin accumulation is formed mainly in the pertinent contact point on the minor axis side. This causes the phenomenon that a desired amount of resin is not supplied for the stretch molding on the major axis side requiring a large magnification of elongation, thereby exerting an adverse effect on stretch molding. Furthermore, when the time required by the stretch molding on the major axis side (the time for which the parison reaches the cavity) becomes long, the pertinent resin accumulation on the minor axis side is cooled further and the degree of elongation decreases. These were recognized as the causes of the nonuniform wall thickness, and if a parison is housed in the cavity in a flat shape beforehand, as a result of molding, the difference in the magnification of elongation between the minor axis side and major axis side decreases, the adverse effect of a thick-walled resin accumulation on stretch molding is reduced, a decrease in the degree of elongation is suppressed, and wall thickness balance is obtained between the minor axis side and the major axis side, with the result that the uniformity of wall thickness of the container wall is realized in a molded article of a flat container. This knowledge constituted basic elements in the prior inventions.

In order to give a concrete form to these basic invention elements, in the prior applications, a preformed parison having a uniform wall thickness in transverse section and a roughly circular section is subjected to primary blow molding and molded into a bottomed cylindrical body having a diameter larger than the minor axis of a mold for secondary blow molding, and this bottomed cylindrical body is caused to shrink in a heated condition. On the other hand, a mold having a cavity of the sectional shape of a flat container, which is a molded article, is prepared, the bottomed cylindrical body which has been caused to shrink is housed in a cavity for secondary blow molding, and mold clamping is performed, with the bottomed cylindrical body depressed (crushed) in the minor axis direction of the cavity. As a result, the bottomed cylindrical body is housed in such a manner that the section of the bottomed cylindrical body becomes longer on the major axis side of the cavity (the side corresponding to the major axis or long-side length of the body of the flat container) than on the minor axis side of the cavity (the side corresponding to the minor axis or short-side length of the body of the flat container), and the bottomed cylindrical body is depressed and deformed in a flat condition. This condition is schematically shown as a sectional view in (d) of FIG. 2. And when secondary blow molding is performed, the wall thickness on the minor axis side and major axis side of the formed flat container becomes sufficiently uniform.

Incidentally, Japanese Patent Publication No. 59-53861 described above discloses a method for obtaining a flat container that involves inflating a bottomed parison having a circular section in a first blow mold into an intermediate molded article, inserting this intermediate molded article into a second blow mold, flattening the intermediate molded article into an elliptical shape by mold closing, and then performing blow molding. Under this method, as can be seen in Figure (C) of this document, an intermediate molded article 7 is depressed by mold closing, whereby also the major axis portion of the intermediate molded article 7 is brought into close contact with the mold. On the other hand, in the above-described prior inventions, a parison is subjected to primary blow molding and molded into a bottomed cylindrical body having a diameter larger than the minor axis of a mold for secondary blow molding, the bottomed cylindrical body is then caused to shrink in a heated condition, whereby the bottomed cylindrical body is caused to maintain a diameter which is larger than the minor axis of a cavity within the mold for secondary blow molding, the bottomed cylindrical molded article is then attached to the interior of the mold for secondary blow molding. And as shown in (d) of FIG. 2, mold clamping is performed, with the bottomed cylindrical molded article depressed in a flat condition in the minor axis direction of the cavity within the mold for secondary blow molding, so that the major axis portion of the bottomed cylindrical body does not come into contact with mold surfaces. The prior inventions differ from the invention of this document in the two points of shrinkage under heat and mold clamping performed so that the major axis portion does not come into contact with mold surfaces. Thanks to these differences, in the prior inventions, the wall thickness is sufficiently made uniform and mechanical strength and heat resistance are improved.

Figure 1:
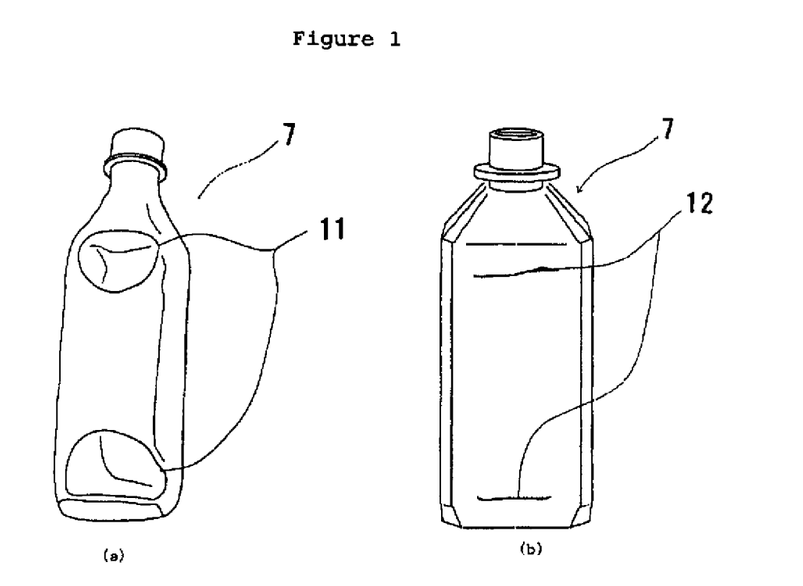
FIG. 1(a) and FIG. 1(b) are respectively a drawing showing the condition of concavity occurrence and a container drawing of a product in which wrinkles are formed when a third intermediate molded article is subjected to blow molding by use of a conventional blow mold for flattening molding.

In the method of the above-described document, the shapability by blow molding is insufficient and wrinkles due to the waviness of concavities occurring partially on the surface of an intermediate molded article during secondary blow molding are apt to remain on the surface of a product, posing the problems of a poor appearance and insufficient strength of the product. When an intermediate molded article 7 shown in FIG. 1(C) of the above-described document is depressed by a molding tool 3b and deformed into a shape 7' to perform blow molding, concavities 11 like waviness occur in the upper and lower parts of the intermediate molded article 7 on the long-side side due to insufficient shapability, as shown in of FIG. 1(a) of the present application. Even if blow molding as shown in FIG. 1(D) of the above-described document is performed in this condition, the shapability is poor and the waviness of the concavities 11 is not eliminated. Therefore, in a product container after blow molding, the concavities 11 are apt to remain as the wrinkles 12 shown in FIG. 1(b) in the present application, posing the problems of a poor appearance, insufficient strength and the like of the product 7.

On the basis of such circumstances, the present application is filed as the second basic invention in order to make more uniform the wall thickness of a container in the inventions related to the prior applications and to further improve mechanical strength, heat resistance, etc., and to aim at solving the problems of a poor appearance and insufficient strength in conventional techniques described in the above-described document, which are posed by the fact that the shapability by blow molding is insufficient and wrinkles due to the waviness of concavities occurring partially on the surface of an intermediate molded article on the major axis side are apt to remain on the surface of a product. The present inventors sought after new means by continuing considerations and trials mainly concerning blow molding conditions, mold constructions, etc. as factors for the uniformity of the wall thickness of the container in the prior inventions and the conventional techniques of the above-described document, and discovered that the surface structure of a blow mold is deeply associated with the uniformity of the wall thickness of a container. The present inventors came to recognize that the slipperiness of resin materials for blow molding on the mold surface is associated with the uniformity of wall thickness and the occurrence of concavities, that in the method of the above-described document concavities and wrinkles occur remarkably when the slipperiness between the intermediate molded articles 7 and 7' and the mold tool 3b of FIG. 1 of this document is poor, and that wrinkles of a product container occur remarkably when an intermediate molded article is caused to shrink by high heat of not less than 150° C. and residual stresses are relieved in order to impart heat resistance to a flat container as in the above-described prior inventions, because a resin material softened in secondary blow molding becomes apt to stick to the blow mold.

On the basis of these recognitions, the inventors of the present application arrived at the constituent features: (1) by subjecting an upper portion and/or a lower portion of a body molding surface of the mold for blow molding at least on the long-side side of a container to mold surface treatment, the slipperiness of a resin material on a partial surface of the mold for blow molding is improved, and as a result of this, further uniformity of the wall thickness of the container is achieved; and (2) by forming one or more convexities, which are horizontal as viewed from the height of a container, in an upper portion and/or a lower portion of a body molding surface in the mold for blow molding at least on the long-side side of the container, the waviness of concavities which partially occurs on the major axis side surface of an intermediate molded article is caused to be absorbed in the convexities and removed, and in a case where minor wrinkles incapable of being completely removed tend to remain, by stretching the wrinkles during secondary blow molding, the prevention of the occurrence of wrinkles on the surface is realized. Thus the present inventors found out the constituent features as the second basic invention of the present application. Furthermore, by combining the features (1) and (2), the occurrence of concavities and wrinkles can be suppressed more as the feature (3).

Figure 7:
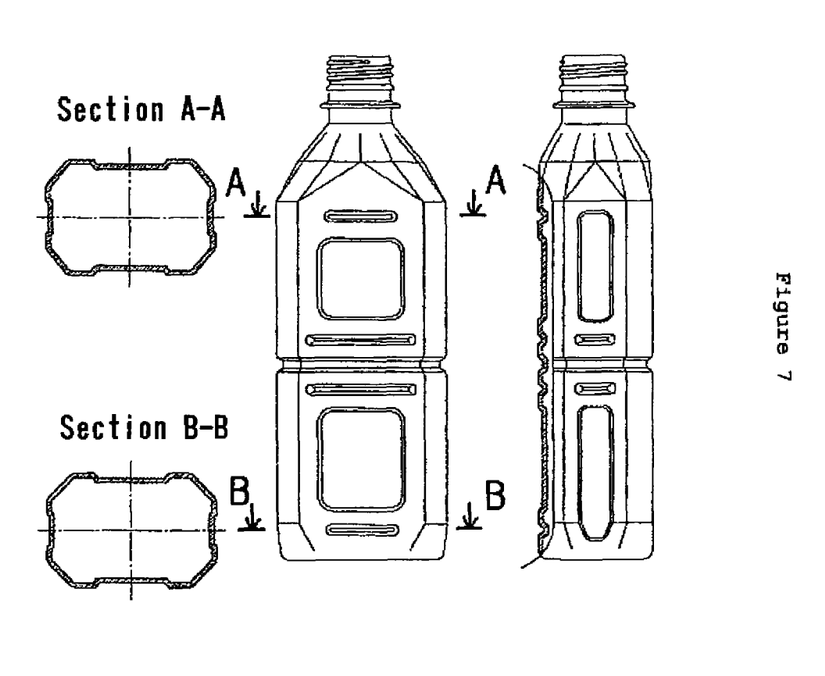
FIG. 7 shows a front view, a side view and a sectional view of a flat container having transverse ribs of the present invention.

Incidentally, as the feature (4), in the body of the product container on the major axis side, transverse (horizontal) concave ribs (cross beams of grooves) are formed by convexities on the blow mold surface as shown in FIG. 7, and it has become possible to form a flat container with transverse ribs that has remarkable uniformity of wall thickness and is excellent in mechanical strength and heat resistance.

Although the second basic invention of the present application is constituted by the features (1) to (3) described above as basic elements of the invention, the features (1) and (2) may also be combined. Furthermore, mold surface treatment, thermoplastic resins that are molding materials, the size of concavities on the mold surface, etc. are also specified.

An overview of the background of the creation of the present invention and basic elements of the present invention was given above. The whole present invention viewed and summarized for clearness is constituted by the following invention unit groups, with [1] and [2] as well as [9] and [10] being basic inventions. The inventions [1] and [2] are the first basic inventions and [9] and [10] are the second basic inventions. These basic inventions are given a concrete form in other inventions, applied to them or embodied in them. Incidentally, all of the invention groups are collectively called "the present invention."

[1] A flat polyester resin container obtained by the blow molding of a polyester resin, which is characterized in that the flatness ratio, which is the ratio of a major axis to a minor axis, is not less than 1.3, that the wall thickness ratio of a maximum wall thickness to a minimum wall thickness of a body of the container is not more than 1.6, and that a difference in elongation between a maximally stretched portion and a minimally stretched portion of the body of the container in a tensile test at 95° C. is not more than 150%.

[2] A flat polyester resin container obtained by the blow molding of a polyester resin, which is characterized in that the flatness ratio, which is the ratio of a major axis to a minor axis, is not less than 1.3, that the wall thickness ratio of a maximum wall thickness to a minimum wall thickness of a body of the container is not more than 1.6, that the crystallinity of the body of the container is not less than 30%, and that a difference in TMA non-load change between a maximally stretched portion and a minimally stretched portion of the body of the container at 75° C. and 100° C. is not more than 500 μm.

[3] A flat polyester resin container obtained by the blow molding of a polyester resin, which is characterized in that the flatness ratio, which is the ratio of a major axis to a minor axis, is not less than 1.3, that the wall thickness ratio of a maximum wall thickness to a minimum wall thickness of a body of the container is not more than 1.6, that a difference in elongation between a maximally stretched portion and a minimally stretched portion of the body of the container in a tensile test at 95° C. is not more than 150%, that the crystallinity of the body of the container is not less than 30%, and that a difference in TMA non-load change between a maximally stretched portion and a minimally stretched portion of the body of the container at 75° C. and 100° C. is not more than 500 μm.

[4] The flat polyester resin container according to any one of [1] to [3], which is characterized in that the sectional shape of the body of the flat container is a rectangle or an ellipse.

[5] The flat polyester resin container according to any one of [1] to [4], which is characterized in that the polyester resin is polyethylene terephthalate.

[6] The flat polyester resin container according to any one of [1] to [5], which is characterized in that the flat container is of a multilayer structure comprising a polyester resin layer and a functional thermoplastic resin layer.

[7] The flat polyester resin container according to any one of [1] to [6], which is characterized in that one or more transverse ribs are provided in a horizontal concavity on a long-side side surface.

[8] The flat polyester resin container according to any one of [1] to [6], which is characterized in that the flat polyester resin container is obtained by subjecting a bottomed parison preformed from a polyester resin to primary blow molding, thereby molding the bottomed parison into a bottomed cylindrical body having a diameter larger than the minor axis of a cavity within a mold for secondary blow molding, thereafter causing the bottomed cylindrical body to shrink in a heated condition, thereby to cause the bottomed cylindrical body to maintain a diameter which is smaller than the major axis of the cavity within the mold for secondary blow molding and larger than the minor axis thereof, attaching the bottomed cylindrical molded article to the interior of the mold for secondary blow molding, performing mold clamping, with the bottomed cylindrical molded article depressed in the minor axis direction of the cavity within the mold, feeding thereafter a pressure fluid into the bottomed cylindrical molded article, and causing the bottomed cylindrical molded article to flow in a heated condition along the shape of the cavity on an inner surface of the mold, thereby to mold the flat polyester resin container.

[9] A two-stage blow molding process of a flat container, which is characterized in that the flat container two-stage blow molding process comprises subjecting a bottomed parison, which is a first intermediate molded article formed from a thermoplastic resin, to primary blow molding to form the first intermediate molded article into a second intermediate molded article having a diameter larger than the minor axis of a cavity within a mold for secondary blow molding, causing the second intermediate molded article to undergo thermal shrinkage, thereby to form the second intermediate molded article into a third intermediate molded article having a body diameter smaller than the major axis of the cavity within the mold for secondary blow molding and larger than the minor axis thereof, attaching the third intermediate molded article to the interior of the mold for secondary blow molding subjected to mold surface treatment in an upper portion and/or a lower portion of a body molding surface thereof at least on the long-side side of a container in order to ensure that the third intermediate molded article is slippery when the third intermediate molded article comes into contact, performing mold clamping, with the third intermediate molded article depressed in the minor axis direction of a mold cavity, and then performing secondary blow molding.

[10] A two-stage blow molding process of a flat container, which is characterized in that the flat container two-stage blow molding process comprises subjecting a bottomed parison, which is a first intermediate molded article formed from a thermoplastic resin, to primary blow molding to form the first intermediate molded article into a second intermediate molded article having a diameter larger than the minor axis of a cavity within a mold for secondary blow molding, causing the second intermediate molded article to undergo thermal shrinkage, thereby to form the second intermediate molded article into a third intermediate molded article having a body diameter smaller than the major axis of the cavity within the mold for secondary blow molding and larger than the minor axis thereof, attaching the third intermediate molded article to the interior of the mold for secondary blow molding, which has convexities formed in an upper portion and/or a lower portion of a body molding surface thereof at least on the long-side side of a container, performing mold clamping, with the third intermediate molded article depressed in the minor axis direction of a mold cavity, and then performing secondary blow molding.

[11] A two-stage blow molding process of a flat container, which is characterized in that the flat container two-stage blow molding process comprises subjecting a bottomed parison, which is a first intermediate molded article formed from a thermoplastic resin, to primary blow molding to form the first intermediate molded article into a second intermediate molded article having a diameter larger than the minor axis of a cavity within a mold for secondary blow molding, causing the second intermediate molded article to undergo thermal shrinkage, thereby to form the second intermediate molded article into a third intermediate molded article having a body diameter smaller than the major axis of the cavity within the mold for secondary blow molding and larger than the minor axis thereof, attaching the third intermediate molded article to the interior of the mold for secondary blow molding subjected to mold surface treatment in an upper portion and/or a lower portion of a body molding surface thereof at least on the long-side side of a container in order to ensure that the third intermediate molded article is slippery when the third intermediate molded article comes into contact, and which mold has convexities formed in at least an upper portion and/or a lower portion of a body molding surface thereof at least on the long-side side of a container, performing mold clamping, with the third intermediate molded article depressed in the minor axis direction of a mold cavity, and then performing secondary blow molding.

[12] The flat container two-stage blow molding process according to [9] or [11], which is characterized in that the mold surface treatment is coating with a fluororesin.

[13] The flat container two-stage blow molding process according to [12], characterized in that the fluororesin is a tetrafluoroethylene perfluoroalkyl vinyl ether copolymer (PFA) or polytetrafluoroethylene (PTFE).

[14] The flat container two-stage blow molding process according to [10] or [11], which is characterized in that the size of convexities formed on a mold surface is such that the lateral width thereof is 30 to 90% of the major axis of a mold cavity surface, the longitudinal width thereof is 1 to 30% of the formed height of a flat product on the mold cavity surface, and the height thereof is 2 to 40% of the minor axis of the mold cavity surface.

[15] The flat container two-stage blow molding process according to any one of [9] to [14], which is characterized in that the thermoplastic resin is a polyester resin or polyethylene terephthalate.

[16] The flat polyester resin container according to any one of [1] to [7], which is characterized in that the flat polyester resin container is molded by the flat container two-stage blow molding process according to any of [9] to [14].

[17] A method for manufacturing a flat container by the two-stage blow molding process, which is characterized in that the method comprises subjecting a bottomed parison preformed from a polyester resin to primary blow molding, thereby molding the bottomed parison into a bottomed cylindrical body having a diameter larger than the minor axis of a cavity within a mold for secondary blow molding, thereafter causing the bottomed cylindrical body to shrink in a heated condition, thereby to cause the bottomed cylindrical body to maintain a diameter which is smaller than the major axis of the cavity within the mold for secondary blow molding and larger than the minor axis thereof, attaching the bottomed cylindrical molded article to the interior of the mold for secondary blow molding, performing mold clamping, with the bottomed cylindrical molded article depressed in the minor axis direction of the cavity within the mold, then feeding a pressure fluid into the bottomed cylindrical molded article, and causing the bottomed cylindrical molded article to flow in a heated condition along the shape of the cavity on an inner surface of the mold, thereby to mold the flat container.

BEST MODE OF CARRYING OUT THE INVENTION

Embodiments of the above-described invention of the present invention groups will be concretely described in detail with reference to the drawings.

1. Basic Constitution (1) Flat Container

The flat container of the present invention is a container which is specified by various kinds of physical properties and to which characteristics are imparted, as will be described in detail below. As shown in FIGS. 3(a) to 3(c) and FIGS. 4(a) to 4(c), the flat container of the present invention is a container whose section has preferably a flat shape, such as a rectangle and an ellipse, with the exception of the mouth opening. Appearance views and sectional views, such as front views, side views and views with arrows, in flat containers are shown in FIGS. 3(a) to 3(c) and FIGS. 4(a) to 4(c).

Because of the flat shapes, beverage bottles formed from the flat container of the present invention can be easily held by consumers with hand and fingers, are not slippery even when the container surfaces are wet while in use, and are beautiful thanks to complex shapes.

(2) Flat Container Formed from Polyester Resin by Blow Molding

The specified flat container of the present invention is manufactured by blow molding a bottomed parison preformed from a polyester resin.

Incidentally, as described above, prior to the creation of the present invention, the inventors of the present application devised the inventions relating to a blow molding method of a flat container in order to manufacture a flat container which has a uniformly formed wall thickness and is excellent in mechanical strength and thermal resistance and which shape is stable even at high temperatures, and they filed applications for these inventions. Therefore, in the molding of the flat container of the present invention, in particular in the above-described inventions [1] and [2], it is possible to use the blow molding method relating to the prior inventions in manufacturing a desired flat container, in which molding is performed with a uniform wall thickness of the container wall, as the above-described invention [8].

Concretely, as shown in FIGS. 2(a) to 2(d) as step drawings, a preformed bottomed parison having a uniform wall thickness in transverse section and a roughly circular section is subjected to primary blow molding and stretched into a bottomed parison having a diameter larger than the minor axis of a mold for secondary blow molding (corresponding to the minor axis of a flat container), and this bottomed parison is caused to shrink in a heated condition to cause the bottomed parison to maintain a diameter which is smaller than the major axis of the cavity within the mold for secondary blow molding. On the other hand, a mold having a cavity of the sectional shape of the flat container, which is a molded article, is prepared, this bottomed, stretched parison is housed in a cavity for secondary blow molding, and mold clamping is performed, with the bottomed, stretched parison depressed into flat condition in the minor axis direction of the cavity to perform the secondary blow molding. As a result, the bottomed, stretched parison is housed in such a manner that the section of the bottomed, stretched parison becomes longer on the major axis side of the cavity than on the minor axis side of the cavity, and the bottomed, stretched parison is depressed and deformed in a flat condition. And when secondary blow molding is performed, the wall thickness on the minor axis side and major axis side of the formed flat container becomes uniform or sufficiently uniform. As a result of this, two-stage blowing of biaxial stretching is performed and this enables the stretching and crystallization of the bottomed parison to be sufficiently carried out and yields the subsidiary action that the heat resistance and pressure resistance of a flat container are remarkably improved.

In the primary blowing of the bottomed parison, the mold is used to stabilize the shape after blowing. However, from an economical aspect, free blowing in which a mold is not used may also be performed.

It is possible to raise the magnification of transverse elongation up to 3 to 5 times and the magnification of longitudinal elongation up to 2 to 4 times in the primary blowing and this brings about the high orientation of crystals and the homogenization of elongation. It is also possible to suppress the magnification of elongation on the minor axis side (the minor axis of the container/the center diameter of the preform) to the order of 2.5 times. In PET, the mold temperature in primary blowing is on the order of 150° C. and cooling is performed by air cooling in free blowing. As the blow molding, the two-stage blowing process of biaxial stretching is desirable in order to improve the physical properties of molded articles.

Incidentally, in general, the mouth opening of a container is not stretched and, therefore, strength and heat resistance are improved by separately performing crystallization under heat.

2. Specification of Flat Container

The specified flat container of the present invention is advantageously manufactured by the blow molding of a bottomed parison preformed from a polyester resin by methods as described above. Properties such as the flatness ratio and wall thickness ratio described below are imparted to the flat container by setting molding conditions and the like and by appropriate designing as in each embodiment, which will be described later.

(1) Flatness Ratio

The flatness ratio is the ratio of the major axis to the minor axis (both being an outside diameter) of the body section of a container, which shows flatness, and provides an index of the flatness of the body section of a container. Concretely, in the containers having a flat shape shown in FIGS. 3(a) to 3(c) and FIGS. 4(a) to 4(c), the flatness ratio is expressed by the ratio of the major axis (6, 106) to the minor axis (7, 107) in the horizontal section (B-B, D-D) of the body (2, 102) of a container (1, 101). Incidentally, in FIGS. 3(a) to 3(c) and FIGS. 4(a) to 4(c), the reference numerals 1 and 101 denote a flat polyester resin container, the reference numerals 2 and 102 denote a container body, the reference numerals 3 and 103 denote a container bottom, the reference numerals 4 and 104 denote a container neck, the reference numerals 5 and 105 denote a container shoulder, the reference numerals 6 and 106 denote the major axis of the container body, the reference numerals 7 and 107 denote the minor axis of the container body, the reference numerals 8 and 108 denote a container mouth opening, the reference numeral 9 denotes a sampling position for the measurement of a maximally stretched portion (a column part), and the reference numeral 10 denotes a sampling position for the measurement of a minimally stretched portion (the middle part of a panel).

In the present invention, the flatness ratio along with the wall thickness ratio etc. of the container body is deeply associated with the mechanical strength, heat resistance, etc. of a flat container in association with the extensibility in the container body at high temperatures, the thermal no-load change of the container body at high temperatures, the crystallinity of the container body, etc. Therefore, from the experiment data (shown in Table 1, which will be described later) it is necessary that the flatness ratio be not less than 1.3, and this specification of the numerical value ensures that beverage bottles are easily held by consumers with hand and fingers and are beautiful because of their complex shapes.

(2) Wall Thickness Ratio of Container Body

The wall thickness ratio of the container body is an index indicative of the uniformity of the wall thickness of the whole container body. The closer to the numerical value of 1, the more the wall thickness will be uniform as a whole, and this is desirable. The wall thickness ratio is expressed as the ratio of a maximum wall thickness to a minimum wall thickness of the section of the container body except the container neck and the part in contact with the ground.

As with the flatness ratio, the wall thickness ratio is deeply associated with the mechanical strength, heat resistance, etc. of a flat container, in association with the extensibility in the container body at high temperatures, the thermal no-load change of the container body at high temperatures, the crystallinity of the container body, etc. Therefore, from the experiment data (shown in Table 1, which will be described later) it is necessary that the wall thickness ratio be not more than 1.6.

(3) Difference in Elongation at High Temperatures

The difference in elongation at high temperatures is deeply associated with the mechanical strength, heat resistance, etc. of a flat container. Therefore, concretely, a difference in elongation between a maximally stretched portion (a column part) and a minimally stretched portion (the middle part of a panel) of the container body in a tensile test at 95° C. is adopted as the difference in elongation at high temperatures. The difference in elongation at high temperatures is illustrated as a graph in FIG. 5, and calculated by an experiment method, which will be described later. From the experiment data (shown in Table 1, which will be described later) it is necessary that the difference in elongation at high temperatures be not more than 150%.

When the difference in elongation between a maximally stretched portion and a minimally stretched portion at high temperatures is not more than 150%, the shape of a container is stable even when the contents of the container are filled at temperatures of the order of 95° C., and the shape is not distorted by deformation unlike conventional flat containers.

(4) Crystallinity

Crystallinity is an index (unit: %) indicative of the crystallizability of the body of a flat container. Crystallinity along with the flatness ratio etc. is deeply associated with the mechanical strength, heat resistance, etc. of a flat container. Therefore, from the experiment data (shown in Table 1, which will be described later) it is necessary that crystallinity be not less than 30%.

Crystallinity is a numerical value particularly indispensable for the improvement of the heat resistance of a container and calculated by an experiment calculating formula, which will be described later.

(5) Difference in No-Load Change

The difference in no-load change of a flat container along with the difference in elongation at high temperatures is deeply associated with the mechanical strength, heat resistance, etc. of a flat container. Therefore, concretely, a difference in TMA (thermomechanical analysis) no-load change between a maximally stretched portion and a minimally stretched portion of the container body in the range from 75° C. to 100° C. is adopted as the difference in no-load change. The difference in no-load change is illustrated as a graph in FIG. 6, and calculated by an experiment method, which will be described later. From the experiment data (shown in Table 1, which will be described later) it is necessary that the difference in no-load change be not more than 500 μm.

The difference in TMA no-load change indicates the evaluation of heat resistance, in particular. When the difference in TMA no-load change is not more than 500 μm, the shape of a container is stable even when the contents of the container are filled at temperatures of the order of 95° C., and the shape is not distorted by deformation unlike conventional flat containers.

In a flat container, a maximally stretched portion and a minimally stretched portion of the container body exhibit different magnifications of elongation and amounts of secondary working and hence the column part and panel part have different heat resistance values. Therefore, when the contents are filled at high temperatures, the panel part bulges and heat resistance tends to become poor. The flat container of the present invention that meets this requirement has a small difference in orientation condition between a maximally stretched portion and a minimally stretched portion compared to conventional flat containers and is excellent in heat resistance and hence the panel part does not bulge even when the contents are filled at high temperatures.

(6) Thermoplastic Resin Materials

Molding resin materials for flatness containers are polyester resins. Although polylactate resin and the like can be mentioned as examples, usual polyethylene terephthalate (PET) is mainly used in consideration of mechanical strength and heat resistance.

In polyethylene terephthalate, the main repetition unit is ethylene terephthalate and it is desirable to use a crystalline resin in which not less than 90 mol % of the acid constituents is terephthalic acid and not less than 90 mol % of the glycol constituents is ethylene glycol. Isophthalic acid, naphthalene dicarboxylic acid, etc. can be mentioned as examples of other acid constituents of this PET, and diethylene glycol, 1,4-butanediol, cyclohexane dimethanol, propylene glycol, etc. can be mentioned as examples of other glycol constituents.

It is also possible to blend an oxygen-absorbing or oxygen-blocking functional resin with the resin constituting a container. Furthermore, according to the use, in order to impart other performance, it is possible to appropriately blend various kinds of additives, such as a usual coloring agent, ultraviolet absorbing agent, antioxidant, antibacterial agent and oxygen absorbing agent.

(7) Multilayer Materials

The present invention also covers a flat thermoplastic resin container characterized by comprising a multilayer structure of a polyester resin layer and a functional thermoplastic resin layer. For this reason, in the present invention, a laminated, bottomed parison, which is a multilayer material, can be appropriately used, and the oxygen blocking properties are improved by the laminating with, for example, polyamide and EVAL. The oxygen absorbing properties may also be improved by providing an oxygen absorbing layer in the intermediate layer. A polymer induced from polyene is desirable as an oxidizable material used in the oxygen absorbing layer. Resins containing units induced from polyenes containing 4 to 20 carbon atoms or open-chain or cyclic conjugated or nonconjugated polyenes are advantageously used as such polyene.

(8) Formation of Transverse Ribs

As one of the ways of specifying the present invention, as illustrated in FIG. 7, it is also possible to provide one or more transverse ribs of concavities on the long-side side surface of a flat container, and particularly one or more transverse ribs of concavities that are horizontal as viewed from the height of the container. The mechanical strength, heat resistance, etc. are improved more by the ribs. The ribs can be formed by a molding process which will be described later in 3.(2).

3. Method for Molding Flat Containers

The flat container of the present invention can be manufactured by the following basic molding method and improved molding method as two-stage biaxial stretching blow molding.

(1) Basic Molding Method

As already described, the basic steps of the two-stage blow molding process are shown as schematic diagrams in FIGS. 2(a) to 2(d). This is a manufacturing method of a flat container by the two-stage blow molding process comprising the steps (a) to (d): (a) subjecting a bottomed parison (a first intermediate molded article) 22 preformed from a polyester resin to primary blow molding, thereby molding the bottomed parison into a bottomed cylindrical body (a second intermediate molded article) having a diameter larger than the minor axis of a cavity within a mold for secondary blow molding, (b) causing thereafter the bottomed cylindrical body to shrink in a heated condition, thereby to cause the bottomed cylindrical body to maintain a diameter which is smaller than the major axis of the cavity within the mold for secondary blow molding and larger than the minor axis thereof, (c) attaching the bottomed cylindrical molded article (a third intermediate molded article) to the interior of the mold for secondary blow molding 20, and performing mold clamping, with the bottomed cylindrical molded article 23 depressed (crushed) in the minor axis direction of the cavity 21 within the mold, (d) feeding thereafter a pressure fluid into the bottomed cylindrical molded article, and causing the bottomed cylindrical molded article to flow in a heated condition along the shape of the cavity on an inner surface of the mold, thereby to mold the flat container.

The step (a) involves subjecting a bottomed parison having a section of a roughly circular shape preformed from a thermoplastic resin to primary blow molding, thereby molding the bottomed parison into a bottomed cylindrical body having a section of a roughly circular shape and a diameter larger than the minor axis of a cavity within a mold for secondary blow molding.

The parison is formed by usual means, such as an injection molding machine and an extrusion molding machine, and thermoplastic polyethylene terephthalate (PET) is used as the material. However, in addition, any resin such as polyethylene, polypropylene and polycarbonate may also be used. As the parison to be used, a bottomed parison having a section of a roughly circular shape is desirable from the standpoints of production efficiency and blow efficiency, and the size of the parison is appropriately set according to the size of a desired flat container, secondary blow efficiency, etc.

In the primary blowing of a parison, a mold is used to stabilize the shape after blowing. However, from an economical aspect, the primary blowing may be performed by free blowing in which a mold is not used.

It is possible to raise the magnification of transverse elongation up to 3 to 5 times and the magnification of longitudinal elongation up to 2 to 4 times in the primary blowing and this brings about high orientation of crystals and the homogenization of elongation. In PET, the mold temperature in primary blowing is on the order of 150° C. and cooling is performed by air cooling in free blowing.

The step (b) involves causing the bottomed cylindrical body to shrink in a heated condition. After the bottomed parison is molded into a bottomed cylindrical body (an intermediate molded article) having a section of a roughly circular shape and a diameter which is larger than the minor axis of the cavity within the mold for secondary blow molding, the bottomed cylindrical body is caused to shrink under heat in an oven, whereby residual strains generated in the resin by the primary blow molding are relieved and the bottomed cylindrical body is caused to maintain a diameter which is smaller than the major axis of the cavity within the mold for secondary blow molding and larger than the minor axis thereof.

In PET, heating conditions which are such that the bottle temperature behind the oven is not less than 150° C. are adopted. Crystallization and thermal fixing are homogeneously and sufficiently performed by this step and the parison that has been stretched and inflated by primary blowing is caused to shrink and is reduced in diameter.

The size of the section diameter of the intermediate molded article after thermal shrinkage is an important requirement to be considered when the intermediate molded article is housed (attached) in the mold for secondary blowing by being depressed in a flat shape. In order to ensure that the stretching on the major axis side is sufficiently performed and that the wall thickness becomes uniform, this size is set in such a manner that a gap for the stretching of the intermediate molded article is maintained between the intermediate molded article which has been stretched by the deformation due to depression on the major axis side and the inner surface of the mold. Incidentally, in order to ensure a uniform wall thickness of a molded article, it is preferred that the size of the section diameter of the intermediate molded article be on the order of 1.1 to twice the minor axis of the cavity of the secondary blow mold.

The step (c) involves attaching the intermediate molded article to the interior of the mold for secondary blow molding, and performing mold clamping, with the intermediate molded article depressed in the minor axis direction of the cavity within the mold. By ensuring that the intermediate molded article is attached to the interior of the mold for secondary blow molding, that mold clamping is performed, with the intermediate molded article depressed in the minor axis direction of the cavity within the mold as viewed from the section thereof, and that the intermediate molded article is housed in the cavity beforehand in a flat condition, the intermediate molded article is housed in such a manner that the section of the intermediate molded article becomes longer on the major axis side of the cavity than on the minor axis side thereof and the intermediate molded article is deformed by depression into a flat shape so that a gap for the stretching of the intermediate molded article is maintained between the intermediate molded article which has been stretched by the deformation due to depression on the major axis side and the inner surface of the mold.

The step (d) involves feeding a pressure fluid into the bottomed cylindrical molded article, and causing the intermediate molded article to flow in a heated condition along the shape of the cavity on an inner surface of the mold, thereby to mold the flat container. The step corresponds to secondary blowing in the two-stage blow molding to mold by blowing the intermediate molded article to a final shape of the flat container.

It is preferred that a split mold be used as the mold for secondary blow molding, and for the sake of convenience, it is preferred that heated air be used as the pressure liquid. The blowing air pressure is on the order of 2 to 4 MPa, which are usual values.

As a result of such secondary blowing, the balance of wall thickness between the minor axis side and the major axis side is obtained and the uniformity of the wall thickness of container wall is realized in a molded article of a flat container. And by performing secondary blow molding, the difference in the magnification of elongation on the minor axis side and the major axis side is reduced and the wall thickness of a formed flat container on the minor axis side and the major axis side becomes sufficiently uniform.

(2) Improved Molding Method

As illustrated in FIGS. 1(a) and 1(b), in the above-described method of conventional technique of Japanese Patent Publication No. 59-53861, the shapability of blow molding is insufficient and wrinkles due to the waviness of concavities occurring partially on the surface of an intermediate molded article during the second blow molding are apt to remain on the surface of a product, posing the problems of a poor appearance and insufficient strength. Therefore, in this application, which might be called the second basic invention, by solving such problems, an improved molding method which will be described below was created in order to make the wall thickness uniform to a greater extent and to improve mechanical strength, heat resistance, etc. This improved molding method basically involves performing surface treatment to a mold or forming convexities in a mold.

a. Surface Treatment of Mold

In the basic step of the feature (1) described above, by subjecting an upper portion and/or a lower portion of a body molding surface of the mold for blow molding at least on the long-side side of a container (corresponding to the major axis side in the case of a elliptical section) to mold surface treatment, the slipperiness of a resin material on a partial surface of the mold for blow molding is improved, and as a result of this, further uniformity of the wall thickness of the container is achieved. And at the same time, by thoroughly performing the shaping by blow molding, wrinkles due to the waviness of concavities occurring partially on the surface of an intermediate molded article are prevented from being formed and the problems of poor appearance and insufficient strength are solved.

Examples of the mold surface treatment include surface roughening treatment and coating treatment. In surface roughening treatment, for example, the mold surface may be roughened by being rubbed with sandpaper, water-resistant paper and the like, or the mold surface may be roughened by sandblasting treatment and iepco treatment (a surface treatment method which involves performing peening with ultrafine hard balls after the removal of burrs from the surface to be treated and cleaning thereof.

Examples of the coating treatment include coating with silicon, tungsten disulfide, fluororesin, etc. In particular, however, coating with fluororesin is desirable from the standpoints of the slipperiness between a third intermediate molded article and the mold in the blow molding of the third intermediate molded article and of the durability of a coating agent.

As the fluororesin, a tetrafluoroethylene perfluoroalkyl vinyl ether copolymer (PFA) and polytetrafluoroethylene (PTFE) are preferably be used.

b. Formation of Convexities on Mold Surface

In the basic step of the feature (1) described above, by forming one or more convexities, which are preferably horizontal as viewed from the height of a container, in an upper portion and/or a lower portion of a body molding surface in the mold for blow molding at least on the long-side side of the container, the waviness of concavities which partially occurs on the major axis side surface of an intermediate molded article is caused to be absorbed in the convexities, and in a case where minor wrinkles incapable of being completely removed tend to remain, by stretching the wrinkles during secondary blow molding, further uniformity of the wall thickness of the container is achieved. And at the same time, by thoroughly performing the shaping by blow molding, wrinkles due to the waviness of concavities occurring partially on the surface of an intermediate molded article are prevented from being formed in a product container and the problems of poor appearance and insufficient strength are solved.

For the size of convexities formed on a mold surface, it is preferred from experimental verifications that the lateral width thereof be 30 to 90% of the major axis of a mold cavity surface, that the longitudinal width thereof (the width equivalent to the vertical height of a container) is 1 to 30% of the formed height of a flat product on the mold cavity surface, and that the height thereof is 2 to 40% of the minor axis of the mold cavity surface. It is because the waviness of concavities which partially occurs on the major axis side surface of an intermediate molded article is absorbed in the convexities.

Incidentally, by providing a large number of convexities parallel to the body diameter direction on the side surface on the major axis side of a container as shown in FIG. 7, the surface area of the convexities increases and it becomes easier to absorb the waviness of the concavities in an intermediate molded article. The concavities on the container surface may be made deep stepwise and may also be provided in a pressure-reducing absorption panel. In FIG. 7, the formation of convexities on the mold surface is also illustrated as indicated by the hatched area.

c. Combination of Surface Treatment of Mold Surface and Formation of Convexities The problem in the conventional techniques as illustrated in FIGS. 1(a) and 1(b) can be solved more sufficiently and efficiently by adopting the combination of the above-described surface treatment of the mold surface and formation of convexities on the mold surface.

EMBODIMENTS

The present invention will be concretely described below in further detail by comparing embodiments with reference examples (comparative examples) with reference to the drawings. The following embodiments and comparative examples are to illustrate the preferred embodiment of the present invention and to describe the present invention more clearly. Furthermore, these embodiments and comparative examples are to demonstrate the rationality and significance of the constituent features of the present invention.

[Measuring Methods]

1) Measurement of Crystallinity

Test pieces are cut out of the body of a flat container and the density of the test pieces $\rho$ (g/cm$^3$) is found by the density-gradient tube method. The crystallinity is calculated by the following equation.

Crystallinity (%)={$\rho c(\rho-\rho a)/\rho(\rho c-\rho a)$}×100

$\rho c$: Crystal density (1.455 g/cm$^3$)
$\rho a$: Noncrystal density (1.335 g/cm$^3$)

2) Measurement of Difference in Elongation in 95° C. Tensile Test

Figure 3:
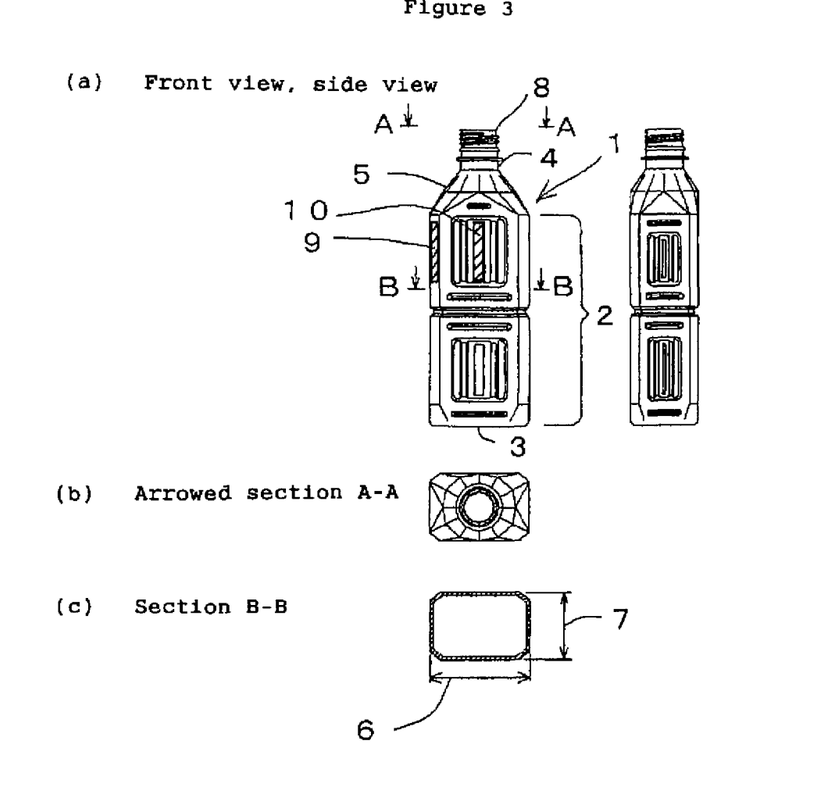
FIG. 3(a) are a front view and a side view of a rectangular flat container of the present invention, the front view including places where measurement samples are taken.
FIG. 3(b) is a diagram that shows a section taken along line A-A in the front view of FIG. 3(a)
FIG. 3(c) is a diagram that shows a section taken along line B-B in the front view of FIG. 3(a)
Figure 4:
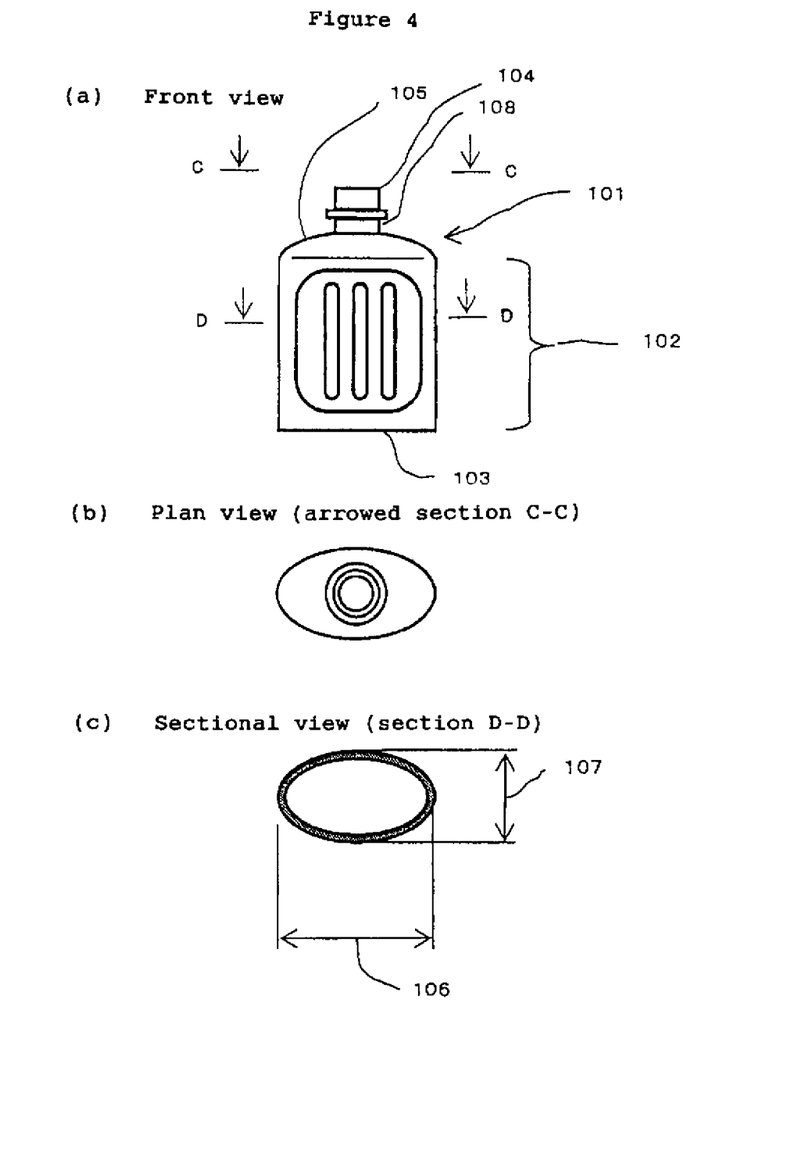
FIGS. 4(a), 4(b) and 4(c) are a front view, a plan view and a sectional view, respectively, of a ellipsoidal flat container of the present invention.

As shown in FIG. 3(a), a strip-like test piece having a size 5×40 mm is cut out in the longitudinal (height) direction each in the maximally stretched portion (a column part) 9 and a minimally stretched portion (the middle part of a panel) 10 at the same level of the body of a flat container, and the test pieces are subjected to a tensile test in a thermoregulator at 95° C. A difference in a maximum elongation between the two places is regarded as the difference in elongation by stretching at 95° C.

Incidentally, the measurement was made, with the chuck distance set at 10 mm and the crosshead speed set at 10 mm/minute, and measurement results were indicated by elongation (%)=($\Delta L/L_0$)×100, where the chuck distance is denoted by $L_0$ and the distance over which the sample is stretched is denoted by $\Delta L$.

TENSILON universal testing machine UCT-500 made by ORIENTEC Co., Ltd. was used as the test apparatus.

Figure 5:
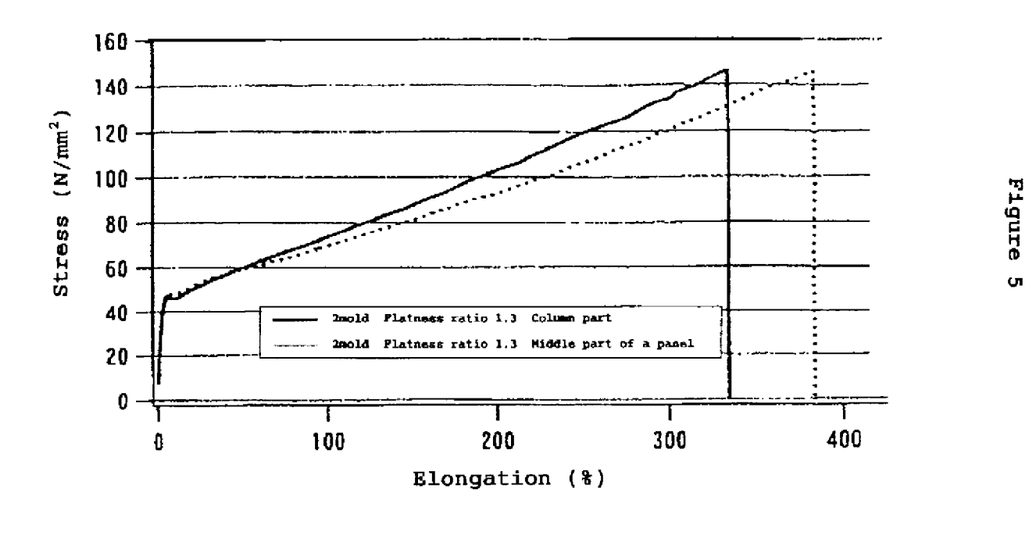
FIG. 5 is a graph that shows measurement results of a difference in elongation in a high-temperature tensile test at 95° C.

FIG. 5 illustrates a graph that shows measurement results of a difference in elongation in the tensile test at 95° C. In FIG. 5, the difference in the maximum elongation between a maximally stretched portion and a minimally stretched portion is 389−333=56%.

3) Measurement of Difference in TMA No-Load Change

As shown in FIG. 3(a), a strip-like test piece having a size 5×40 mm is cut out in the longitudinal (height) direction each in the maximally stretched portion (a column part) 9 and a minimally stretched portion (the middle part of a panel) 10 at the same level of the body of a flat container, and the test pieces are measured by TMA (a thermomechanical analysis) method. A difference in change between the two places is regarded as the difference in TMA no-load change.

As the measurement method of the difference in TMA no-load change, measurements are made, with the stress applied to the test piece set at zero, the chuck distance set at 20 mm, and the temperature rise rate from room temperature to 100° C. at 5° C./minute. In the digitalization of changes, calculations are made on the basis of changes from 75° C. near the glass transition temperature, which is the starting point, to 100° C. DMS-6100 made by Seiko Instruments Inc. was used as the test apparatus.

Figure 6:
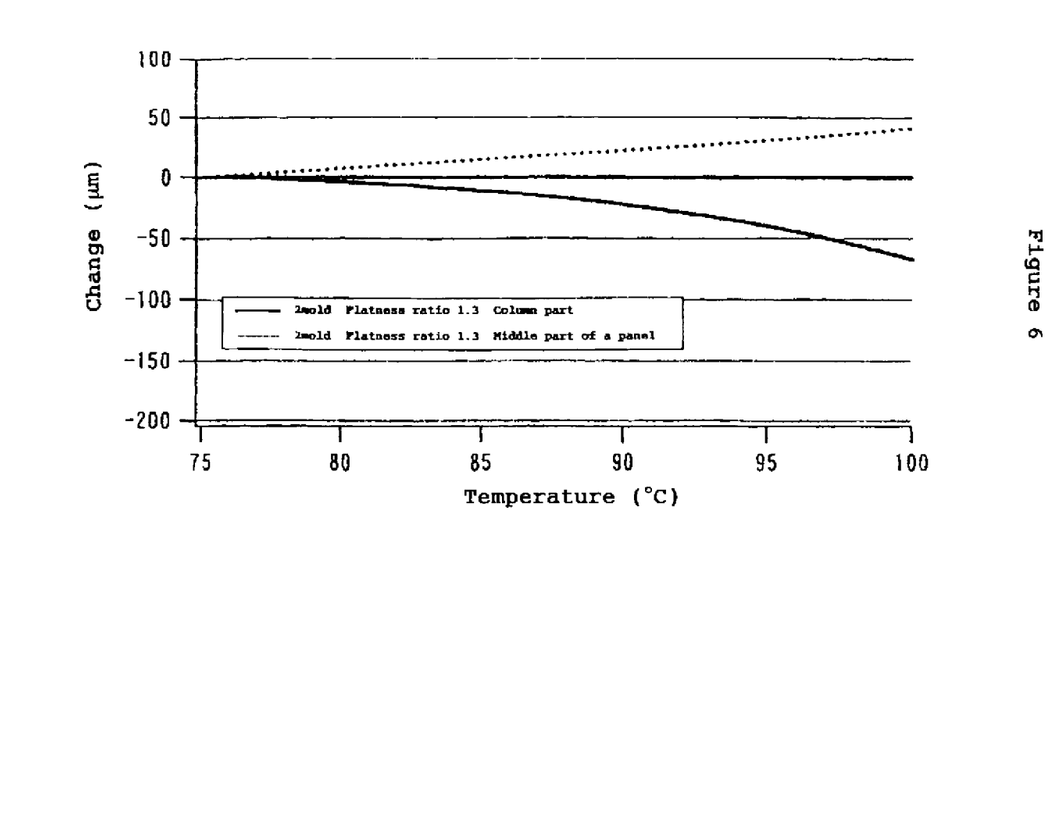
FIG. 6 is a graph that shows measurement results of a difference in TMA non-load change.

FIG. 6 illustrates a graph that shows measurement results of a difference in TMA non-load change. From FIG. 6, the difference in a change between a maximally stretched portion and a minimally stretched portion observed when the temperature rose from 75° C., which is the starting point, to 100° C. is 42−(−68)=110 μm.

Equivalent to Embodiment 1

4) Method of Heat Resistance Evaluation

Hot water at 87° C. was filled in a flat container, the flat container was showered with warm water at 75° C. for five minutes after hermetical sealing, and the container was visually checked for deformation. (◯: without deformation, x: with deformation)

Embodiment 1

A bottomed parison, which was a first intermediate molded article having an outside diameter of 22 mm, a thickness of 3.4 mm and a height of 80 mm, was preformed from commercially available polyethylene terephthalate (PET), heated air was blown in by free blowing and the first intermediate molded article was subjected to primary blow molding to form a second intermediate molded article having an outside diameter of 90 mm.

The second intermediate molded article subjected to the primary blow molding was caused to shrink and be fixed for 8 seconds in an oven at 600° C. and a shrunk, molded article having an outside diameter of 60 mm, which was a third intermediate molded article, was obtained.

Figure 2:
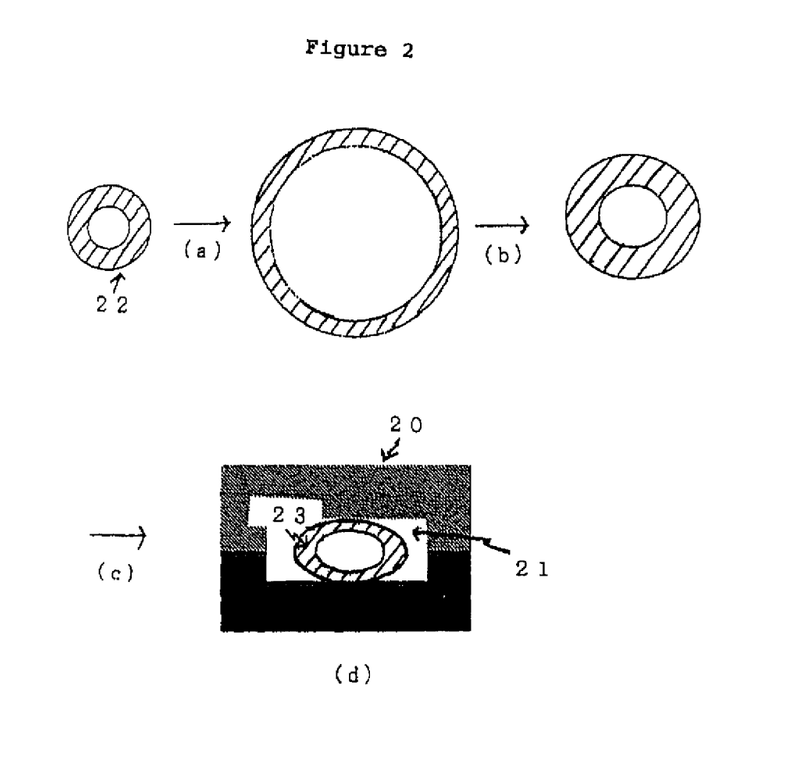
FIG. 2 is a schematic diagram that shows each step in the blow molding of the present invention.

A mold for second blow molding (set at 140° C.) had a cavity (section: minor axis 50 m, major axis 66 mm) with the rectangular section shown in (d) of FIG. 2, and an upper portion of a body molding surface of the blow mold on the long-side side of a container was coated with a fluororesin. The third intermediate molded article was housed in the cavity by being depressed into the cavity in the minor axis direction.

Air at 20° C. and 3 MPa was fed into the third intermediate molded article deformed by depression and secondary blow molding was performed, whereby a flat container having a rectangular section and a flatness ratio of 1.3 was molded. No wrinkle remained in the body of this flat container.

Table 1 shows measurement results of the crystallinity of the body of this flat container, the wall thickness ratio of a maximum wall thickness to a minimum wall thickness of the section of the container, the difference in elongation between a maximally stretched portion and a minimally stretched portion of the container body in a tensile test at 95° C., and the difference in TMA no-load change in a maximally stretched portion and a minimally stretched portion of the container body in the range from 75° C. to 100° C.

Embodiment 2

A flat container having an elliptical section and a flatness ratio of 1.5 was molded in the same way as in Embodiment 1, with the exception that primary blow molding was performed by using a mold for primary blow molding instead of performing free blow molding and that a mold which upper portion of a body molding surface thereof on the long-side side (major axis side) of a container was coated with a fluororesin and which had a cavity (section: minor axis 47 mm, major axis 70 mm) with an elliptical section was used as a second blow mold.

Embodiment 3

A flat container having a rectangular section and a flatness ratio of 2.0 was molded in the same way as in Embodiment 1, with the exception that primary blow molding was performed by using a mold for primary blow molding instead of performing free blow molding and that a mold which upper portion of a body molding surface thereof on the long-side side of a container was coated with a fluororesin and which had a cavity (section: minor axis 40 mm, major axis 80 mm) with a rectangular section was used as a second blow mold.

Embodiment 4

A flat container having a rectangular section and a flatness ratio of 2.5 was molded in the same way as in Embodiment 1, with the exception that primary blow molding was performed by using a mold for primary blow molding instead of performing free blow molding and that a mold which upper portion of a body molding surface thereof on the long-side side of a container was coated with a fluororesin and which had a cavity (section: minor axis 36 mm, major axis 90 mm) with a rectangular section was used as a second blow mold.

Embodiment 5

A flat container having a rectangular section and a flatness ratio of 2.0 was molded in the same way as in Embodiment 3, with the exception that a mold which lower portion of a body molding surface thereof on the long-side side of a container was coated with a fluororesin and which had a cavity (section: minor axis 40 mm, major axis 80 mm) with a rectangular section was used as a second blow mold.

Embodiment 6

A flat container having a rectangular section and a flatness ratio of 2.0 was molded in the same way as in Embodiment 3, with the exception that a mold which had convexities in an upper portion of a body molding surface thereof on the long-side side of a container and had a cavity (section: minor axis 40 mm, major axis 80 mm) with a rectangular section was used as a second blow mold.

Embodiment 7

A flat container having a rectangular section and a flatness ratio of 2.0 was molded in the same way as in Embodiment 3, with the exception that a mold which had convexities in a lower portion of a body molding surface thereof on the long-side side of a container and had a cavity (section: minor axis 40 mm, major axis 80 mm) with a rectangular section was used as a second blow mold.

Embodiment 8

A flat container having a rectangular section and a flatness ratio of 2.0 was molded in the same way as in Embodiment 3, with the exception that a mold which had convexities in an upper portion and a lower portion of a body molding surface thereof on the long-side side of a container and in which the whole area of a container molding surface was coated with a fluororesin, and which had a cavity (section: minor axis 40 mm, major axis 80 mm) with a rectangular section was used as a second blow mold.

Also the flat containers molded in Embodiments 2 to 8 were product containers having no wrinkle in the body and a good appearance. Table 1 shows measurement results of the crystallinity of the bodies of these flat containers, the wall thickness ratio of a maximum wall thickness to a minimum wall thickness of the sections of the containers, the difference in elongation between a maximally stretched portion and a minimally stretched portion of the container bodies in a tensile test at 95° C., and the difference in TMA no-load change in a maximally stretched portion and a minimally stretched portion of the container bodies in the range from 75° C. to 100° C.

Comparative Example 1

A flat container having a rectangular section and a flatness ratio of 1.3 was molded by using the same preformed parison as used in Embodiment 1, stretching the preformed parison by use of a mold for primary blow molding, housing a shrunk, intermediate molded article in the mold with a size not depressed in the minor axis direction, using the same mold for secondary blowing molding as used in Embodiment 1, and performing blow molding under the same blowing conditions.

Comparative Example 2

A flat container having a rectangular section and a flatness ratio of 2.0 was molded by using the same preformed parison as used in Embodiment 1, stretching the preformed parison by use of a mold for primary blow molding, housing a shrunk, intermediate molded article in the mold with a size not depressed in the minor axis direction, using the same mold for secondary blowing molding as used in Embodiment 3, and performing blow molding under the same blowing conditions.

Comparative Example 3

A flat container having a rectangular section and a flatness ratio of 2.0 was molded in the same way as in Embodiment 3, with the exception that a mold in which the whole area of a container molding surface was subjected to mirror finish treatment and which had a cavity (section: minor axis 40 mm, major axis 80 mm) with a rectangular section was used as a mold for secondary blowing. In the flat container formed in Comparative Example 3, wrinkles remained in an upper portion and a lower portion of the body on the long-side side and the shape was poor.

Table 1 shows measurement results of the crystallinity of the bodies of the flat containers molded in Comparative Examples 1 to 3, the wall thickness ratio of a maximum wall thickness to a minimum wall thickness of the sections of the containers, the difference in elongation between a maximally stretched portion and a minimally stretched portion of the container bodies in a tensile test at 95° C., and the difference in TMA no-load change in a maximally stretched portion and a minimally stretched portion of the container bodies in the range from 75° C. to 100° C.

properties in a maximally stretched portion and a minimally stretched portion of the container body was small. Therefore, the mechanical strength was sufficient and the heat resistance was also good. In each of the embodiments, the difference in elongation between a maximally stretched portion and a minimally stretched portion at high temperatures was small compared to the comparative examples and also the difference in TMA no-load change was also small compared to the comparative examples. Therefore, even when the contents are filled at high temperatures, the shape is stable and the shape is not distorted by deformation unlike conventional flat containers.

In Comparative Examples 1 and 2, a shrunk, intermediate molded article is housed in the mold with a size not depressed in the minor axis direction. Therefore, as is apparent from the numerical values shown in Table 1, the circumferential wall thickness ratio of the container body was large compared to each of the embodiments. Thus Comparative Examples 1 and 2 were inferior to each of the embodiments in the uniformity of the wall thickness. Also the difference in elongation between a maximally stretched portion and a minimally stretched portion at high temperatures and the difference in TMA no-load change were large compared to each of the embodiments. Thus Comparative Examples 1 and 2 were inferior to each of the embodiments in heat resistance and mechanical strength.

In Comparative Example 3, a shrunk, intermediate molded article is housed in the mold by being depressed in the minor

TABLE 1

|  | Flatness ratio | Crystallinity (%) | Wall thickness ratio | Difference in elongation in 95° C. tensile test (%) | TMA difference (μm) | Heat resistance |
|---|---|---|---|---|---|---|
| Embodiment 1 | 1.3 | 38 | 1.24 | 49 | 110 | o |
| Embodiment 2 | 1.5 | 40 | 1.30 | 71 | 209 | o |
| Embodiment 3 | 2.0 | 42 | 1.35 | 106 | 313 | o |
| Embodiment 4 | 2.5 | 41 | 1.41 | 138 | 404 | o |
| Embodiment 5 | 2.0 | 42 | 1.36 | 107 | 320 | o |
| Embodiment 6 | 2.0 | 41 | 1.35 | 109 | 331 | o |
| Embodiment 7 | 2.0 | 40 | 1.36 | 110 | 328 | o |
| Embodiment 8 | 2.0 | 41 | 1.35 | 115 | 320 | o |
| Comparative Example 1 | 1.3 | 40 | 1.65 | 177 | 701 | x |
| Comparative Example 2 | 2.0 | 39 | 1.72 | 195 | 900 | x |
| Comparative Example 3 | 2.0 | 42 | 1.35 | 106 | 313 | Unevaluated because of poor shape |

[Consideration of Results of Each Embodiment and Each Comparative Example]

By comparing each of the embodiments with each of the comparative examples, it is made obvious that a flat container in the present invention is excellent in heat resistance and mechanical strength if it meets the requirements for the flatness ratio, the wall thickness ratio, crystallinity, the difference in elongation in a tensile test at 95° C., and the TMA difference. Furthermore, it has become obvious that a poor appearance, such as wrinkles, does not occur any more by performing two-stage blow molding that involves secondary blow molding after a third intermediate molded article is depressed by use of a secondary blowing mold which is subjected to coating with a fluororesin or in which convexities are formed.

In Embodiments 1 to 8, as is apparent from the numerical figures shown in Table 1, the circumferential wall thickness ratio of the body of each container was small with high uniformity of the wall thickness and the difference in physical axis direction. However, because a mold for blow molding subjected to mirror finish treatment is used, as is apparent from the numerical values shown in Table 1, Comparative Example 3 is excellent in the circumferential wall thickness ratio of the container body, the difference in elongation in a maximally stretched portion and a minimally stretched portion at high temperatures, and the difference in TMA no-load change to the same extent as each of the embodiments. However, the shapability (moldability) of secondary blow molding was poor, the heat resistance could not be evaluated.

It can be said from the foregoing that it is obvious that the rationality and significance in the constituent features of the present invention and the advantage of the present invention over conventional techniques have been demonstrated.

INDUSTRIAL APPLICABILITY

The flat container in the present invention is excellent in mechanical strength and heat resistance, the shape of the container is stable even at high temperatures, and there is no fear that the container might be deformed because of insufficient resistance against inner pressure loads due to the expansion of beverages in the container at high temperatures and against external pressure loads due to the shrinkage of the interior during temperature drops.

Therefore, this flat container is particularly excellent as containers for high-temperature beverages and containers for high-temperature pasteurized beverages, and is also advantageously used for food in general, medical products, etc.

The flat container two-stage blow molding process in the present invention can easily manufacture a flat container whose wall thickness is made uniform remarkably and which is particularly excellent in mechanical strength, heat resistance and pressure resistance, without the occurrence of wrinkles due to defective molding on the container surface.

As described above, the present invention enables excellent containers used in various technical fields and their molding methods to be developed, is useful in the industries of plastic molding and plastic containers, and has high industrial applicability.

The invention claimed is:

1. A flat polyester resin container comprising polyester resin and obtained by a two-stage blow molding of a polyester resin,
    wherein the flatness ratio, which is the ratio of a major axis to a minor axis of a cross section parallel to the bottom of the container, is not less than 1.3,
    the wall thickness ratio of a maximum wall thickness to a minimum wall thickness of a body of the container is not more than 1.6,
    a difference in elongation between a maximally stretched portion and a minimally stretched portion of the body of the container in a tensile test at 95° C. is not more than 150%,
    the crystallinity of the body of the container is not less than 30%, and
    a difference in TMA non-load change between a maximally stretched portion and a minimally stretched portion of the body of the container at 75° C. and 100° C. is not more than 500 μm,
    wherein the flat polyester resin container is obtained by a process comprising:
    subjecting a bottomed parison preformed from a polyester resin to primary blow molding, thereby molding the bottomed parison into a bottomed cylindrical body having a diameter larger than the minor axis of a cavity within a mold for secondary blow molding, thereafter
    causing the bottomed cylindrical body to shrink in a heated condition, thereby to cause the bottomed cylindrical body to maintain a diameter which is smaller than the major axis of the cavity within the mold for secondary blow molding and larger than the minor axis thereof,
    attaching the bottomed cylindrical molded article to the interior of the mold for secondary blow molding and performing mold clamping, with the bottomed cylindrical molded article depressed in a flat condition in the minor axis direction of the cavity within the mold for secondary blow molding, so that the major axis portion of the bottomed cylindrical body does not come into contact with mold surfaces,
    feeding thereafter a pressure fluid into the bottomed cylindrical molded article, and causing the bottomed cylindrical molded article to flow in a heated condition along the shape of the cavity on an inner surface of the mold, thereby to mold the flat polyester resin container.

2. The flat polyester resin container according to claim 1, wherein the sectional shape of the body of the flat container is a rectangle or an ellipse.

3. The flat polyester resin container according to claim 1, wherein the polyester resin is polyethylene terephthalate.

4. The flat polyester resin container according to claim 1, wherein the flat container is of a multilayer structure comprising a polyester resin layer and a functional thermoplastic resin layer.

5. The flat polyester resin container according to claim 1, wherein one or more transverse ribs are provided in a horizontal concavity on a long-side side surface.

6. The flat polyester resin container according to claim 1, wherein the flat container is of a multilayer structure comprising a polyester resin layer and a functional thermoplastic resin layer, and one or more transverse ribs are provided in a horizontal concavity on a long-side side surface.

* * * * *